(12) United States Patent
Carmichael

(10) Patent No.: US 10,749,888 B2
(45) Date of Patent: Aug. 18, 2020

(54) PREREQUISITE QUANTITATIVE RISK ASSESSMENT AND ADJUSTMENT OF CYBER-ATTACK ROBUSTNESS FOR A COMPUTER SYSTEM

(71) Applicant: Bank of America Corporation, Charlotte, NC (US)

(72) Inventor: Martin Anthony Carmichael, Aubrey, TX (US)

(73) Assignee: Bank of America Corporation, Charlotte, NC (US)

( * ) Notice: Subject to any disclaimer, the term of this patent is extended or adjusted under 35 U.S.C. 154(b) by 252 days.

(21) Appl. No.: 15/915,826

(22) Filed: Mar. 8, 2018

(65) Prior Publication Data

US 2019/0281082 A1 Sep. 12, 2019

(51) Int. Cl.
*H04L 29/06* (2006.01)
*G06F 21/57* (2013.01)
*G06N 20/00* (2019.01)

(52) U.S. Cl.
CPC ........ *H04L 63/1433* (2013.01); *G06F 21/577* (2013.01); *G06N 20/00* (2019.01)

(58) Field of Classification Search
CPC .............................. G06F 21/566; G06F 21/677
See application file for complete search history.

(56) References Cited

U.S. PATENT DOCUMENTS

| | | | |
|---|---|---|---|
| 6,983,221 B2 | 1/2006 | Tracy et al. | |
| 7,346,922 B2 | 3/2008 | Miliefsky | |
| 7,552,480 B1 | 6/2009 | Voss | |
| 7,913,303 B1 | 3/2011 | Rouland et al. | |
| 8,595,180 B2 | 11/2013 | Wu et al. | |
| 8,595,845 B2 | 11/2013 | Basavapatna et al. | |
| 8,613,080 B2 | 12/2013 | Wysopal et al. | |
| 8,856,936 B2 | 10/2014 | Datta Ray et al. | |
| 9,129,108 B2 | 9/2015 | Drissi et al. | |
| 9,356,942 B1 | 5/2016 | Joffe | |
| 9,491,185 B2 | 11/2016 | Selep et al. | |
| 9,747,570 B1 | 8/2017 | Vescio | |
| 2004/0064726 A1* | 4/2004 | Girouard | G06F 21/577 726/25 |
| 2014/0013434 A1* | 1/2014 | Ranum | H04L 63/145 726/24 |
| 2015/0096027 A1* | 4/2015 | Romanenko | G06F 21/56 726/23 |
| 2016/0232358 A1 | 8/2016 | Grieco et al. | |

\* cited by examiner

*Primary Examiner* — Jason K Gee
(74) *Attorney, Agent, or Firm* — Banner & Witcoff, Ltd.; Michael A. Springs

(57) ABSTRACT

Aspects of the disclosure relate to assessing and adjusting robustness to cyber-attacks of a computer system. The capability of defending against cyber-attacks by cyber-tools (via protection methods) is mapped to one or more attack vectors. One or more cyber-tools may be activated based on the capability mapping. Based on protection data generated by the computer system, an assessment computing device determines a cyber-robustness metric for the one or more cyber-tools and may invoke a reconfiguration of the cyber-tools to increase the cyber-robustness of the computer system. A machine learning machine may process the protection data, such as log data, to detect one or more patterns to determine an effectiveness of the activated cyber-tools. With some embodiments, the machine learning machine groups the protection data using a subset of variables and forms meta structures from the subset.

20 Claims, 11 Drawing Sheets

| Tool Name | Attack Vectors | Log Location |
|---|---|---|
| Tool_A ～601 | Attack Vector 1 ～603<br>Attack Vector 23 ～604<br>Attack Vector 200 ～605 | File A ～606 |
| Tool_B | Attack Vector 23<br>Attack Vector 101 | File B |
| ... | ... | ... |

| Number | Pattern Description 701 | Technology Identifier Protection 702 | Est. Capability 703 | Process Identifier Protection 704 | Est. Capability 705 | People Identifier 706 | Est. Capability 707 |
|---|---|---|---|---|---|---|---|
| 1 | The ability to send an ICMP type 13 query (Timestamp Request) to a remote target and receive an ICMP type 14 message (Timestamp Reply) in response. | XXX Firewall | 30% | | | | |
| 2 | An attacker must be able to reproduce behavior that would result in an account being locked. | Application X | 20% | | | | |
| 3 | The attacker must be able to see the names of the files the target is creating. | IDS System XXX | 75% | | | | |
| 4 | The adversary must have the means to alter data to which he/she is not authorized. | IAM / DB | 60% | ARM Request | 10% | | |

PREREQUISITE QUANTITATIVE RISK ASSESSMENT AND ADJUSTMENT OF CYBER-ATTACK ROBUSTNESS FOR A COMPUTER SYSTEM

FIELD

Aspects of the disclosure relate to cyber-attacks of a computer system. For instance, some aspects determine a measurement of cyber-attack robustness of the computer system and adjust the computer system to increase the cyber-robustness.

BACKGROUND

A cyber-attack is any type of offensive maneuver employed by nation-states, individuals, groups, or organizations that targets computer information systems, infrastructures, computer networks, and/or personal computer devices by various means of malicious acts usually originating from an anonymous source that either steals, alters, or destroys a specified target by hacking into a susceptible system. According to traditional approaches for preventing a cyber-attack, one typically forms a well-formed risk statement having a cyber-attack model based on vulnerabilities and threat actors such as a nation states, activists, hackers, and so forth. Because different cyber-attack (risk) models may specify different risk statements, threat actors, and characteristics, the traditional models often vary from one computer system to another and are consequently highly subjective and non-repeatable.

SUMMARY

Aspects of the disclosure provide effective, efficient, scalable, and convenient technical solutions that address and overcome the technical problems associated with determining a measurement of cyber-attack robustness of the computer system and adjusting the robustness based on the robustness measurement.

In accordance with one or more embodiments, common attack patterns are obtained from a universal cyber-attack database that is applicable to different computer systems. The universal cyber-attack data comprises a set of attack patterns and a corresponding set of attack vectors, where different attack patterns may have overlapping attack vectors and a given attack vector may be associated with different attack patterns. The universal cyber-attack database associates one or more attack vectors with each attack pattern. This approach enables modeling of cyber-attacks that is objective, deterministic, quantitative, and repeatable across different computer systems.

In accordance with one or more embodiments, a capability of addressing cyber-attacks by different cyber-tools is mapped to one or more attack vectors based on cyber capability of the cyber-tools. Each cyber-tool supports protection methods (vectors) that counteract one or more attack vectors either completely or partially. Based on the cyber-tools configured for a computer system, a capability metric for cyber-attack robustness is obtained, where the capability metric measures the number of attack vectors addressed in the set of known attack vectors by the configured cyber-tools.

In accordance with one or more embodiments, one or more attack vectors are mapped to personnel associated with a computer system and/or processes executing on the computer system. The personnel and processes support protection vectors that counteract one or more attack vectors. Moreover, a capability to address cyber-attacks may include the protection provided by configured cyber-tools, as discussed above, in conjunction with the personnel and processes.

In accordance with one or more embodiments, a learning engine processes log information generated by a configured cyber-tool to detect the effectiveness of the configured cyber-tool in a computer system. The learning engine detects a pattern of patterns in the log information to determine whether a particular attack vector (for example, as identified in a tool mapping) is defended against by the configured cyber-tool. The effectiveness of the configured cyber-tool gauges how well the capability of the cyber tool is covered with respect to attack vectors mapped to the cyber-tool. The configuration of the cyber-tool for the computer system may be subsequently modified to increase the effectiveness of the cyber-tool based on the tool's potential benefit.

In accordance with one or more embodiments, a heuristic (learning) engine groups protection data from a computer system by isolating a subset of variables causing the grouping. The heuristic engine generates meta structure from the protection data based on matching edges for the subset of variables in order to detect patterns characterized by the meta structure.

In accordance with one or more embodiments, an effectiveness metric may be obtained for the cyber-tools configured for a computer system. If the determined effectiveness metric does not meet a predetermined objective for a computer system, additional cyber-tools may be configured for the computer system to address one or more attack vectors that is not sufficiently covered. By counteracting an attack vector contained in a set of attack vectors modeled by a universal cyber-attack database, a robustness to cyber-attacks is increased so that the residual risk of vulnerabilities and the probability of zero day attacks is reduced.

In accordance with one or more embodiments, an assessment computing device determines a cyber-robustness metric for a computer system, where the cyber-robustness metric gauges a cyber-attack robustness of the assessed computer system to the cyber-attack. The assessment computing device adjusts a cyber-robustness model for the assessed computer system to increase the cyber-robustness metric, and reconfigures a subset of cyber-tools activated at the computing system.

In accordance with one or more embodiments, an assessment computing device obtains vulnerability data for a computer system and determines a cyber-risk metric for a protection method from a cyber-robustness metric and the vulnerability data. The assessment computing device then adjusts a cyber-risk model for the assessed computer system to decrease the cyber-risk metric and applies the adjusted risk model to the computer system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 shows an exemplary mapping of a set of cyber-tools to a plurality of cyber-tools in accordance with one or more exemplary embodiments.

FIG. 7 shows an exemplary mapping of cyber-tools, processes, and personnel to attack patterns in accordance with one or more exemplary embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to determining cyber-metrics for a computer system that utilizes one or more cyber-tools, where cyber-tools defend against specific attack vectors. An assessment computing device processes protection data generated by the computer system while executing with the cyber-tools and adjust a cyber-model that provides greater robustness against cyber-attacks.

Some embodiments may support a capability metric that quantifies the people/process/technologies that mitigate attack vectors and an effectiveness metric that quantifies how effective the cyber-capability is in mitigating the attack vector.

Some embodiments provide a cyber-robustness/risk model that is quantitative because the model utilizes universal cyber parameters, that is repeatable because it generates that same answers with different practitioners, and that is deterministic because the results can be evaluated in non-random future states.

Some embodiments support risk models that is driven from attack strategies and methods such as kill chains (for example with a layered model: explore, experiment) and protection strategies that defeat the attacks. The risk models may utilize security layers including prevention, detection, and response to counter an attack.

Figure 1:
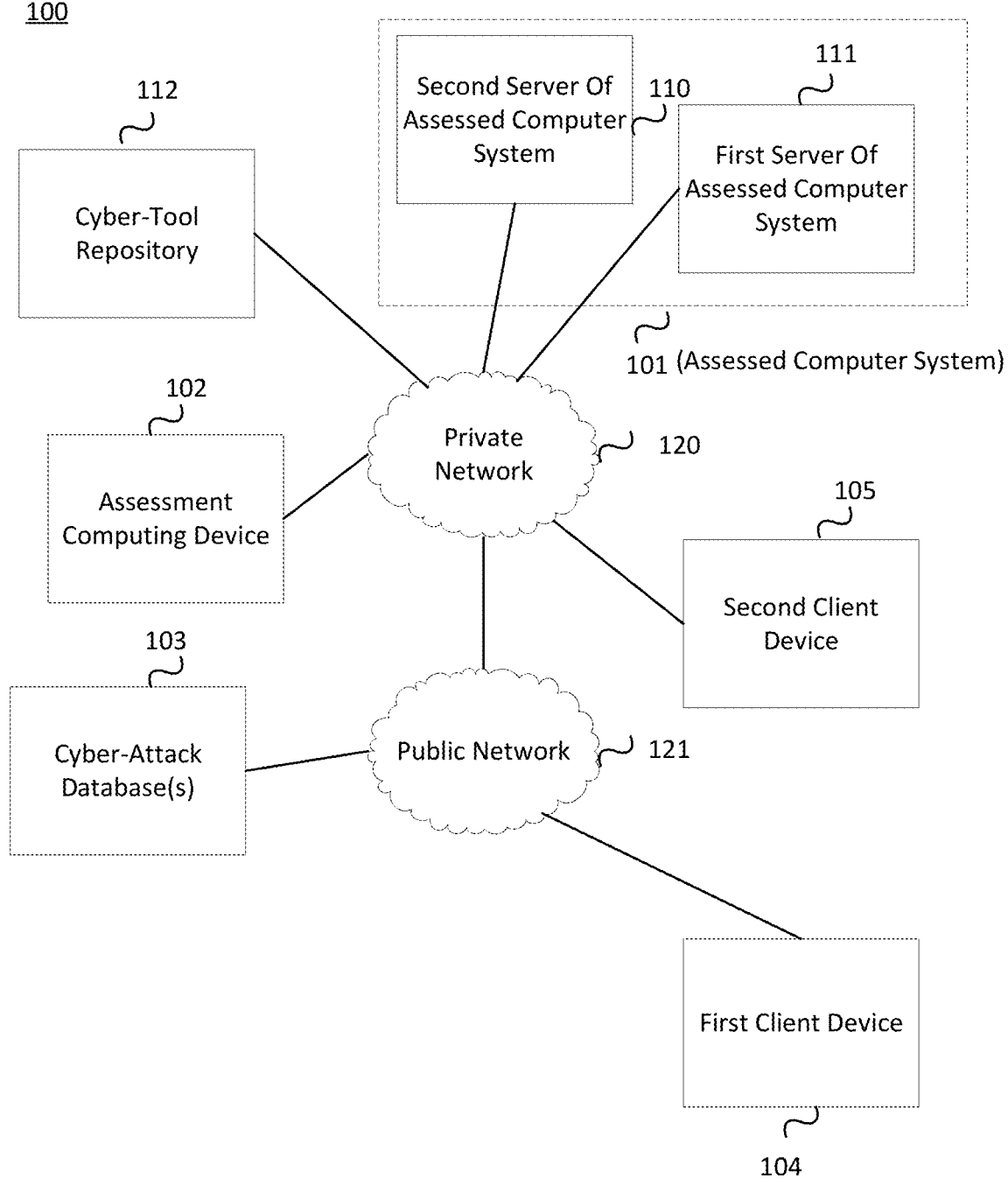
FIG. 1 depicts an illustrative computing environment for utilizing multicomputer processing to gauge and adjust cyber-attack robustness of an assessed computer system in accordance with one or more exemplary embodiments.

FIG. 1 depicts an illustrative computing environment 100 for utilizing multicomputer processing to gauge cyber-attack robustness of assessed computer system 101 by assessment computing device 102. Assessed computer system 101 may include one or more computer servers such as servers 110 and 111. With some embodiments, assessment computing device 102 comprises laptop computers, desktop computers, servers, server blades, or the like.

Assessment computing device 102 assesses the robustness to cyber-attacks of assessed computer system 101. As will be discussed, assessed computer system 101 utilizes a set of cyber-tools that may be downloaded from or executed by tool repository 112. Each cyber-tool (security tool) supports protection vectors/methods that counter (protect against) one or more attack vectors (which may be referred to as prerequisites) of a cyber-attack. With some embodiments, one may refer to a cyber-tool supporting a protection method when protection is directed to a plurality of attack vectors rather than a single attack vector.

In order to evaluate computing system 101, assessment computing device 102 obtains schema data and/or advisory data from database(s) 103. As will be further discussed, schema data may model mechanisms of a cyber-attack based on attack patterns. Each attack pattern may then be mapped to attack vectors (prerequisites to a cyber-attack), attack steps, and mitigations to the cyber-attack. Advisory data may include information about evaluating cyber-tools (technologies) with respect to cyber-protection.

Computing environment 100 also may include one or more client devices (for example devices 103 and 104) that enable an interaction with assessment computing device 102. The degree of the interaction may be based on the degree that processes are automated on assessment computing device 102. For example, as will be discussed, if assessment computing device 102 determines that an effective metric (which gauges the robustness of cyber-attacks) of computing system 101 is not sufficient, current cyber-tools may be reconfigured to better utilize those tools by an administrator interacting with computer system 101. With some embodiments, assessment computing device 102 may automatically search a tool mapping, which maps available cyber-tools to counter attack vectors not effectively handled by current cyber-tools, and automatically configure additional cyber-tools that may do so.

As illustrated in greater detail below, computer system 101 may include one or more computing devices configured to perform one or more of the functions described herein. For example, computer system 101 may include one or more computers (for example, laptop computers, desktop computers, servers, server blades, and the like).

Computing environment 100 also may include one or more networks (for example, networks 120 and 121), which may interconnect servers 110-111, assessment computing device 102, cyber-attack databases 103, client computing devices 104-105, and cyber tool repository 112.

Private network 120 and/or public network 121 may include one or more sub-networks (for example, local area networks (LANs), wide area networks (WANs), or the like).

Private network 120 may be associated with a particular organization (for example, a corporation, financial institution, educational institution, governmental institution, or the like) and may interconnect one or more computing devices associated with the organization. For example, assessed computer system 101, assessment computing device 102, cyber tool repository 112, and client device 105 may be associated with an organization (for example, a financial institution), and private network 120 may be associated with and/or operated by the organization, and may include one or more networks (for example, LANs, WANs, virtual private networks (VPNs), or the like) that interconnect assessed computer system 101, assessment computing device 102, cyber tool repository 112, and client device 105. Public network 121 may connect private network 120 and/or one or more computing devices connected thereto with one or more networks and/or computing devices that are not associated with the organization. For example, cyber-attack databases 103 and client device 104 may be owned, operated, and/or serviced by one or more entities different from the organization that operates private network 120, such as one or more customers of the organization and/or vendors of the organization, rather than being owned and/or operated by the organization itself or an employee or affiliate of the organization), and public network 121 may include one or more networks (for example, the internet) that connect cyber-attack databases 103 and client device 104.

Figure 2:
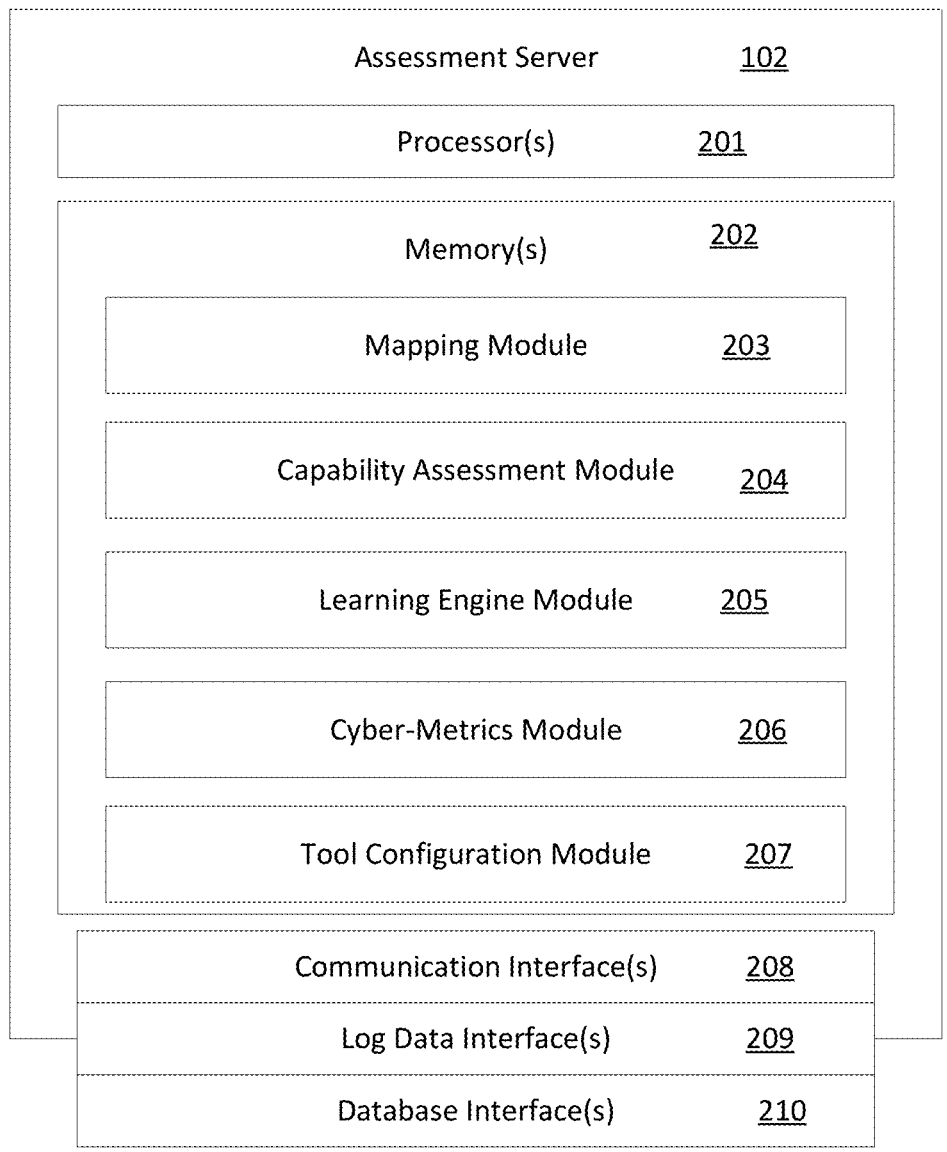
FIG. 2 depicts an illustrative assessment computing device that supports the computing environment shown in FIG. 1 in accordance with one or more exemplary embodiments.

FIG. 2 depicts an illustrative assessment computing device 102 that supports the computing environment 100 shown in FIG. 1 in accordance with one or more example embodiments. Assessment computing device 102 may include one or more processors 201, memory 202, communication interface 208, log data interface 209, and database interface 210. A data bus may interconnect processor(s) 201, memory 202, and interfaces 208-210.

Communication interface 208 may be a network interface configured to support communication between assessment computing device 102 and one or more networks (for example, private network 120, public network 121, or the like). Log data interface 209 may be a network interface that supports log data transfer for one or more cyber-tools in real-time or near real-time from assessed computer system 101 via one or more networks so that assessment computing device 102 can detect the effectiveness of the one or more cyber-tools in countering one or more attack vectors. Database interface 210 may be a network interface that supports cyber data transfer from cyber-attack databases 103.

Memory 202 may include one or more program modules having instructions that when executed by processor(s) 201 cause assessment computing device 102 to perform one or more functions described herein and/or one or more databases that may store and/or otherwise maintain information which may be used by such program modules 203-206 and/or processor(s) 201. In some instances, the one or more program modules and/or databases may be stored by and/or maintained in different memory units of assessment computing device 102 and/or by different computing devices that may form and/or otherwise make up assessment computing device 102. For example, memory 202 may have, store, and/or include mapping module 203, capability assessment module 204, learning engine module 205, effectiveness module 206, and tool reconfiguration module 207.

Mapping module 203 may comprise computer-executable instructions that direct and/or cause assessment computing device 102 to map attack vectors (prerequisites of a cyber-attack) a set of cyber-tools. With some embodiments, mapping module 203 may also map attack vectors to information technology (IT) personnel associated with assessed computer system 101 and/or processes executing on assess computer system 101. For some embodiments, mapping module 203 may form the mapping from accessed data (for example, schema data about attack patterns and attack vectors and advisory data about the cyber-tools) from databases 103 in an automated manner. However, with some embodiments, the mapping may be formed with varying degrees of intervention by personnel.

Capability assessment module 204 may comprise computer-executable instructions that direct and/or cause assessment computing device 102 to activate selected cyber-tools on assessed computer system 101 from the mapped set of cyber-tools based on a capability metric. For example, a predetermined threshold may be configured so that cyber-tools are selected from the set to be at least as great as the threshold.

Learning engine module 205 may comprise computer-executable instructions that direct and/or cause assessment computing device 102 to process log data about the activated cyber-tools from assessed computer system 101 to determine whether the activated cyber-tools are countering the associated cyber-vectors. Results from learning engine 205 are then processed by cyber-metrics assessment module 206.

Cyber-metrics module 206 may comprise computer-executable instructions that direct and/or cause assessment computing device 102 to determine an effectiveness metric based on the information provided by learning engine module 205.

Tool configuration module 207 may comprise computer-executable instructions that direct and/or cause assessment computing device 102 to reconfigure the cyber-tools currently activated and/or activate additional cyber-tools when the effectiveness metric is below a targeted effectiveness threshold.

With some embodiments, modules 203-207 may be embodied in computer-executable code that is stored in one or more memory devices (for example, memory 202) and executed by one or more computer devices (for example, processor 201) and/or embodied in hardware/firmware components such as integrated circuits, application-specific integrated circuits (ASICs), field executable gate arrays, and the like.

Figure 3:
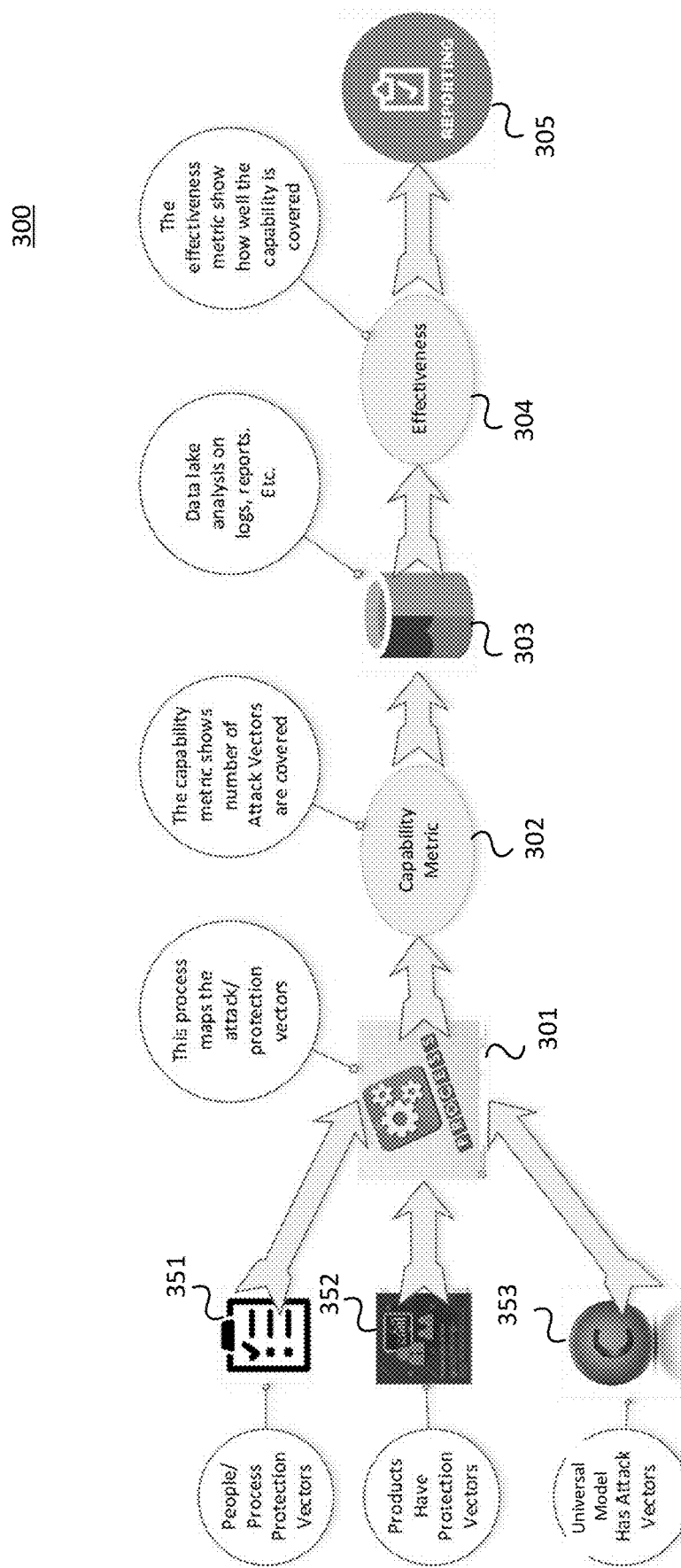
FIG. 3 shows a process that may be executed by an assessment computing device for assessing a capability and an effectiveness of cyber-robustness for a computer system in accordance with one or more exemplary embodiments.

FIG. 3 shows process 300 that may be executed with assessment computing device 101 (as shown in FIG. 1) for assessing a capability and an effective of cyber-robustness for computer system 102.

Figure 4:
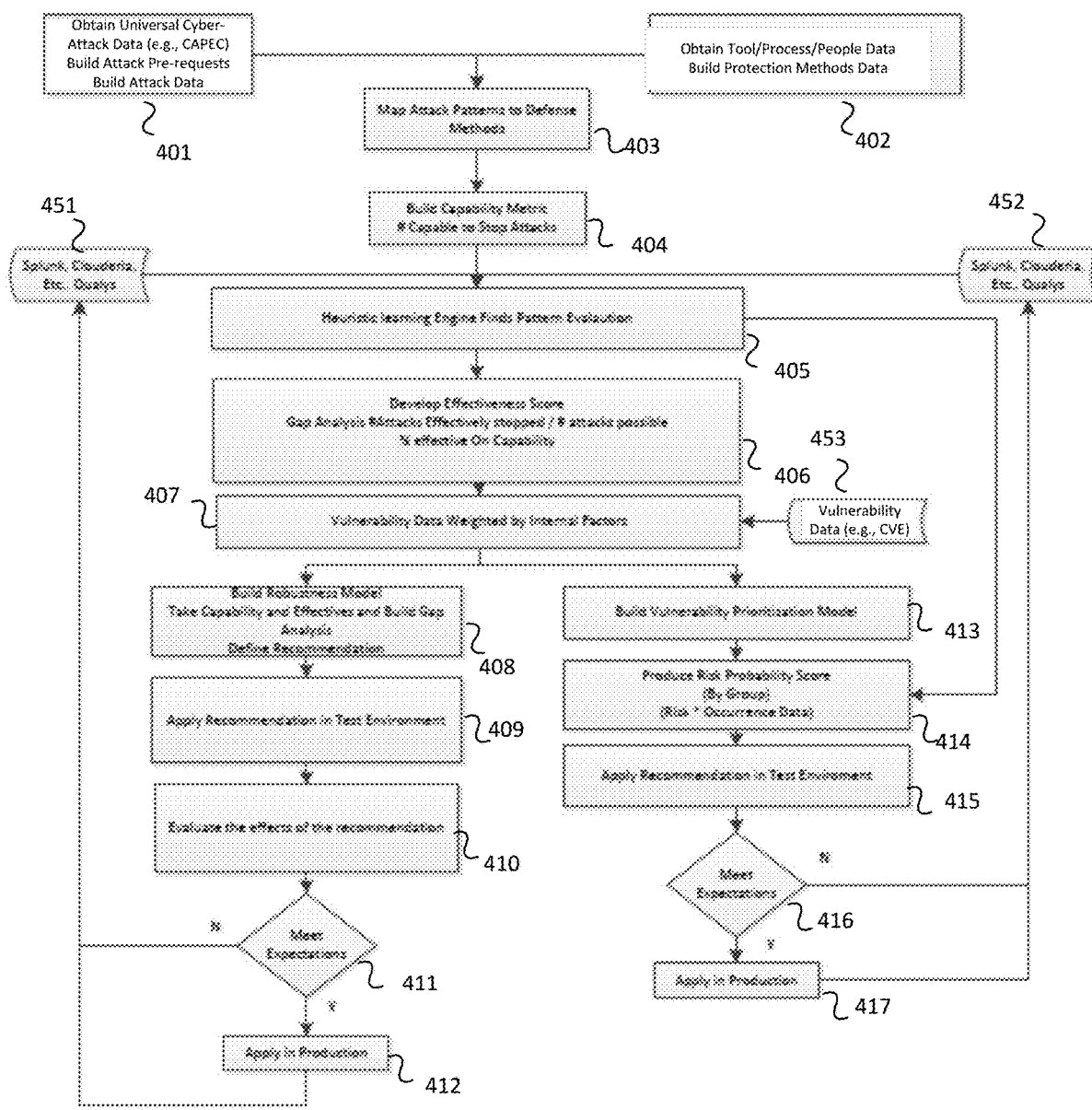
FIG. 4 shows a flowchart that may be executed by an assessment computing device for assessing and adjusting cyber-robustness for a computer system in accordance with one or more exemplary embodiments
Figure 5:
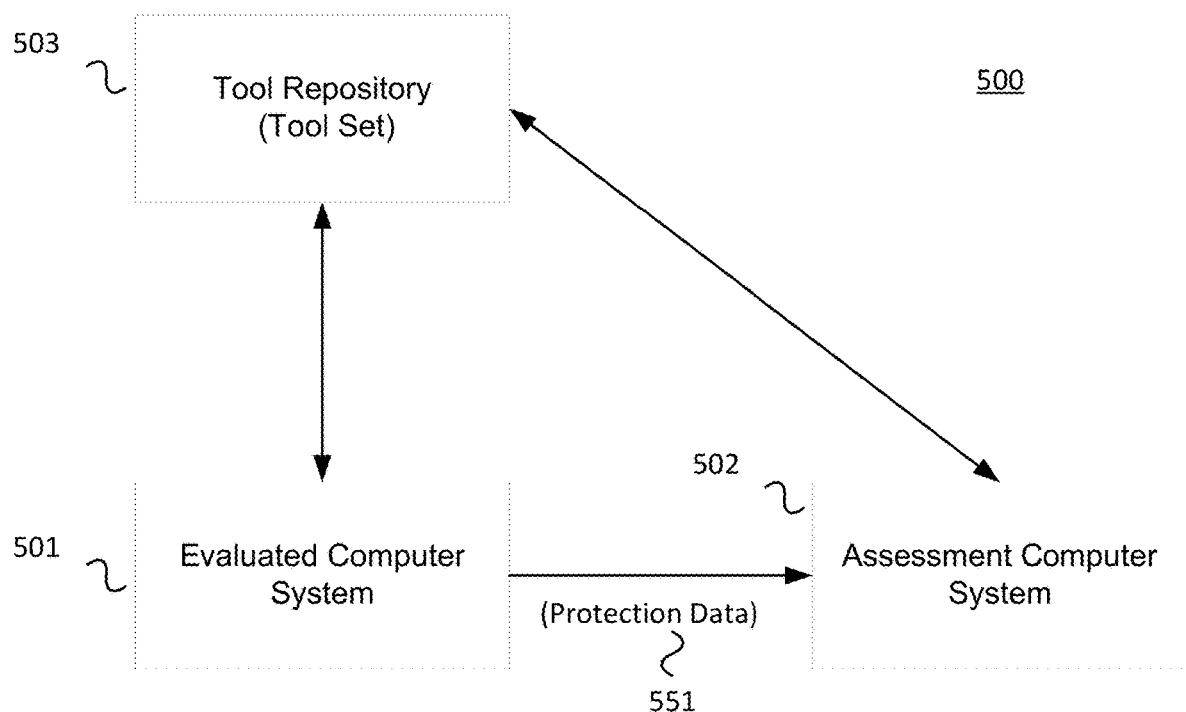
FIG. 5 shows an illustrative computer configuration for utilizing the flowchart shown in FIG. 4 in accordance with one or more exemplary embodiments.

Block 301 generates a mapping that attack cyber-vectors and protection vectors to a set of cyber-tools 352, personnel/processes 351 based on universal cyber-attack data 353. Exemplary embodiments are shown in FIGS. 4 and 5.

With some embodiments, universal cyber-attack data 353 may comprise Common Attack Pattern Enumeration and Classification (CAPEC™) data that comprises a catalog of common attack patterns classified in an intuitive manner, along with a comprehensive schema for describing related attacks and sharing information about them. The CAPEC data may have a tree format, in which a root corresponds to a mechanism of attack and breaks into branches corresponding to categories of attack. The branches continue until leaves break out into specific data. The specific data may provide various elements including a summary, one or more attack vectors, attack step, and solution, and so forth. The decomposition may offer a holistic perspective of cyber-susceptibility (risk) from an attack perspective. Lacking the elements (cyber-attack vectors) for an attack, there is no risk for that attack.

Attack patterns are descriptions of the common elements and techniques used in attacks against vulnerable cyber-enabled capabilities. Attack patterns define the challenges that an adversary may face and how they go about solving it. They derive from the concept of design patterns applied in a destructive rather than constructive context and are generated from in-depth analysis of specific real-world examples.

Each attack pattern captures knowledge about how specific parts of an attack are designed and executed, providing the adversary's perspective on the problem and the solution, and gives guidance on ways to mitigate the attack's effectiveness. Attack patterns help those trying to defend against attacks better understand the specific elements of an attack and how to stop them from succeeding.

As an example, CAPEC identifies "manipulating user state" as one of the 508 possible attack patterns. CAPEC further identifies a corresponding attack vector (attack prerequisite) "User state is maintained at least in some way in user-controllable locations, such as cookies or URL parameters." Corresponding attack steps include:

Explore: An adversary determines the nature of state management employed by the application. This includes determining the location (client-side, server-side, or both) and possibly the items stored as part of the user state.

Experiment: The adversary now tries to modify the user state contents (possibly blindly is the contents are encrypted or otherwise obfuscated) and to observe the effects of this change on the application.

Having determining the information stored in the user state and possible ways to modify it, the adversary can violate it in order to perform the illegitimate actions.

In response, the computer system, in order to counter the attack, may:

Not rely solely on user-controllable locations, such as cookies or URL parameters, to maintain the user state.

Avoid sensitive information, such as usernames or authentication and authorization information, in user-controllable locations.

Protect sensitive information that is part of the user state to ensure confidentiality and integrity at each request.

At block 302, a subset of cyber-tools is activated from the set of cyber-tools so that a capability metric is at least as great as a predetermined threshold. The subset of cyber-tools provides a seed from which learning engine 303 can determine the effectiveness of the cyber-tools to attacks at block 304. With some embodiments, report 305 is generated that is indicative of the effectiveness of each of the activated cyber-tools. With some embodiments, processing of the effectiveness may generate reconfiguration of the activated tools to better utilize the activated cyber-tools and/or activate additional cyber-tools from the set in order to address cyber-vectors not sufficiently covered.

FIG. 4 shows flowchart 400 that may be executed by assessment computing device 102 (as shown in FIG. 1) for assessing and adjusting cyber-robustness of computer system 101 in accordance with one or more exemplary embodiments.

At block 403, assessment computing device 102 maps attacks patterns to defensive methods that are supported by a set of cyber-tools that may be activated on computer 101 to defend against a cyber-attack. The mapping is based universal cyber-attack data obtained at block 401 and protection methods data obtained at block 402.

The universal cyber-attack data may comprise a comprehensive dictionary and classification taxonomy of known attacks that can be used by analysts, developers, testers, and educators to advance community understanding and enhance defenses (universal dictionary of known cyber-attacks) that is independent of a specific computer system and cyber-actor. Common Attack Pattern Enumeration and Classification (CAPEC™) data is an example as previously discussed.

Protection methods data pertains to the protection capability of available cyber-tools. There are numerous cyber-tools (with some embodiments hundreds) that can counter specific attack patterns and attack vectors. For example, an web application firewall may stop URL's and cookies that are inappropriate. As another example, a network detection tool may prevent entities that should not connect to a network of a computer system from connecting to the network. As another example, a web proxy tool allows only the right traffic to go to the right place. Each cyber-tool typically addresses an attack prerequisite (attack vector/ attack pattern) and provides a mitigation or solution to the attack prerequisite.

With some embodiments, protection methods data may be obtained from a security consultant (for example, from Gartner, Inc.). The data is typically indicative of each cyber-tool's capability to counter a particular attack vector and/or attack pattern.

Again referring to block 403, assessment computing device 102 generates a cyber-attack mapping as exemplified in FIGS. 6 and 7. Referring to FIG. 6, mapping 600 maps cyber-tool 601 that provides protection (either fully or partially) to attack vectors 603-605. Cyber-tool 601 generates protection data that memorializes cyber-events handled by tool 601 at log location 606 while computing system 101 is executing when tool 601 is activated.

Referring to FIG. 7 shows an exemplary mapping created at block 403. Attack patterns 701 are mapped to technology identifier protection 702 (corresponding to cyber-tools), process identifier protection 704, and people identifier 706. With some embodiments, cyber-protection may be support by cyber-tools as well as by personnel and processes executed by computer system 101. Also, a cyber-tool, process, or personnel may not be fully capable in countering a particular attack pattern; thus, an estimate of the partially capability is provided in fields 703, 705, and 707.

At block 404, assessment computing device 101 determines a capability for activated cyber-tools with respect to possible attack vectors. Process 400 may consider a subset of cyber-tools that are available at cyber-tool repository 112 and determine the cyber-capability metric for the subset of cyber-tools. For example, process 400 may identify 30 cyber-tools from 100 available cyber-tools. CAPEC identifies 526 attack vectors associated with 508 attack patterns. With this example, if 400 and 126 of the attack vectors were addressed with 100% and 0% capability, respectively, the cyber-capability metric (score) would be 76.04%.

With the embodiment shown in FIG. 4, the cyber-capability metric is determined at block 404 before activating the subset of cyber-tools on computer system 101. With this approach, an initial cyber-tool configuration is obtained. However, the activated cyber-tools may not defend against attack vectors as initially anticipated. As will be discussed, blocks 405-417 measure the actual amount of protection while the subset of cyber-tools are activated when computer system 101 is executing.

At block 405, a learning engine attempts to detect patterns in obtained protection data 451,452. Protection data may include a data lake and may assume different forms including logs, Cloudera, Splunk, spreadsheets, physical data, and the like.

Figure 9:
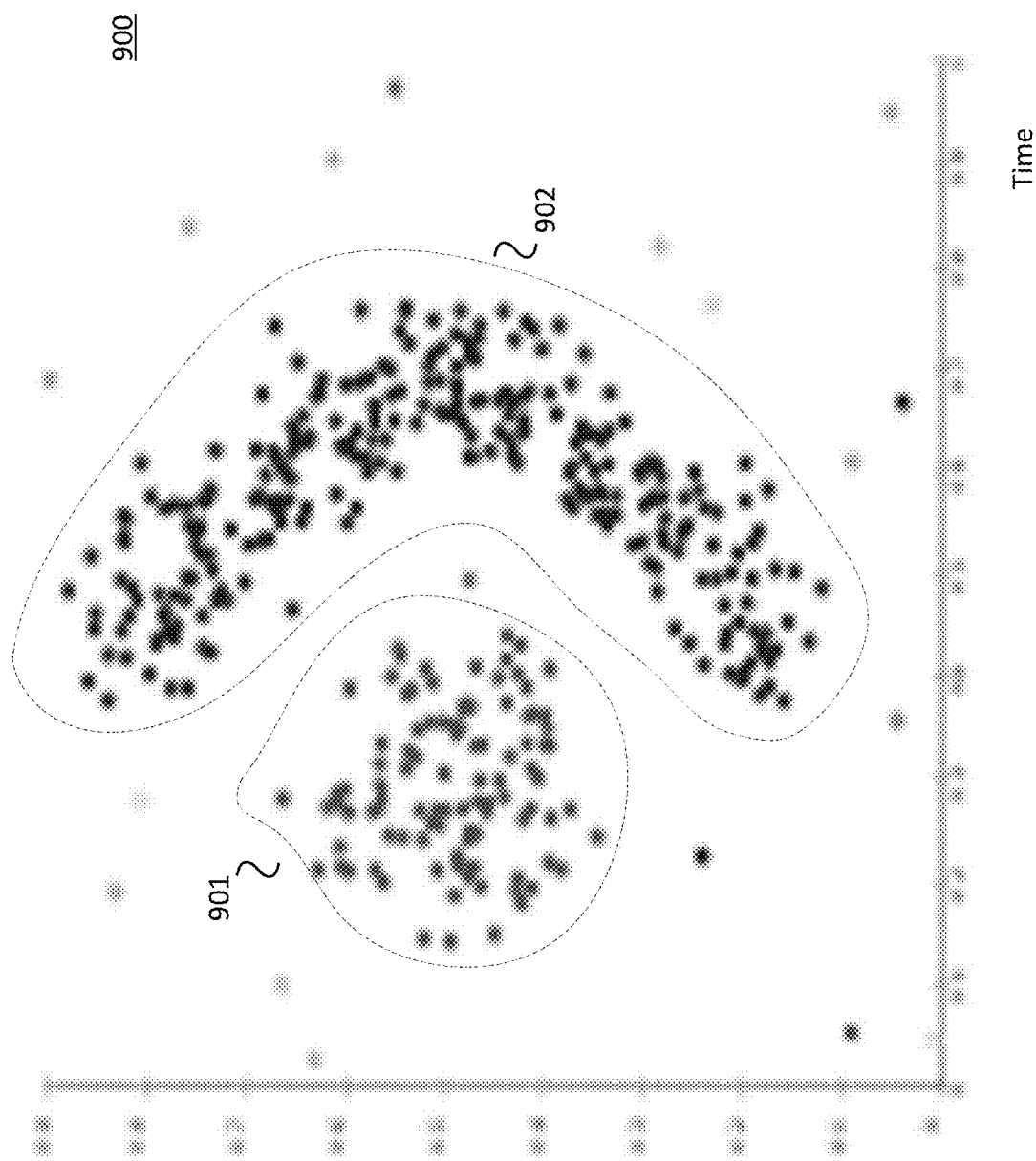
FIG. 9 shows an example of grouping protection data by a machine learning engine in accordance with one or more exemplary embodiments.

With some embodiments, a learning engine may comprise a heuristic engine by using one or more heuristic approaches such as R-squared change, linear regression coefficients, and/or clustering. An exemplary heuristic engine utilizing cluster is shown in FIG. 9 as will be discussed.

From the patterns detected at block 405, an efficiency score (cyber-robustness metric) is determined at block 406. The efficiency score is indicative of the actual protection provided by the cyber-tools during execution of computer system 101. Continuing the above example (where the capability score is 76.04%), efficiency scores may range above 100%. With an efficiency score of 200% for the 400 attack vector population, multiple cyber-tools, processes, and/or personnel address the same attack vectors which, while efficient in addressing attack vectors, is not an optimized method.

In additional to protecting against attack vectors, assessment computing device 101 may also include vulnerabilities of computer system 101 as obtained at block 407. A vulnerability/exposure in a computer system is often defined in a catalog such as a Common Vulnerabilities and Exposures (CVE) that is obtained from vulnerability data 453. A vulnerability is typically a mistake in software code that provides an attacker with direct access to a system or network. For example, the vulnerability may allow an attacker to pose as a super user or system administrator who has full access privileges. An exposure, on the other hand, is defined as a mistake in software code or configuration that provides an attacker with indirect access to a system or network. For example, an exposure may allow an attacker to secretly gather customer information that could be sold. Vulnerabilities may be weighted by a factor between 0 and 1 or between 0 and 100% based on one or more considerations including:

Layer (physical/nonphysical, segmentation)
Complexity (0-100)
System adjacencies
Value Proposition (costing)
Qualys or Tools Scoring
Risk characterization
Historical View Summary (our environment/external environment)
Patch/Other Mitigation
Time Domain (frequency)
Adjacency At blocks 408-412, assessment computing device 102 utilizes the cyber-capability metric (score) and cyber-robustness metric (effectiveness score) as determined at blocks 404 and 406, respectively, to generate an adjusted robustness model that can be subsequently applied to computer system 101. For example, assessment computing device 101 may modify the subset of activated cyber-tools if one or more of the currently activated cyber-tools are detected as not being sufficiently effective in protecting against an attack vector. For example, assessment computing device 102 may add a cyber-tool to the subset of activated cyber-tools if computer system 101 does not sufficiently protect against a particular attack vector. Moreover, assessment computing device 102 may change configuration parameters of a currently activated cyber-tool to obtain protection closer to the capability of the cyber-tool. For example, assessment computing device 102 may indicate that a firewall needs to have stronger filters and/or a proxy needs to detect and reject some types of traffic.

At blocks 413-417, assessment computing device 102 determines a risk metric, adjusts a risk model for computer system 101, and applies the adjusted risk model to computer system 101. However, if a computer system does not have a particular vulnerability or exposure, the corresponding attack vector is not a threat to the system. The cyber-robustness metric as discussed above may not include vulnerability considerations. As will be discussed with FIG. 8, the risk score (risk metric) is based on both the robustness to a particular attack vector and the associated vulnerability. To reduce risk, one can increase the robustness and/or remove/decrease the vulnerability. The risk model supported at block 413 may include available solutions to vulnerabilities (for example, patches that fix software problems) and/or additional cyber-tools that may increase the robustness of computer system 101. Consequently, one can reduce risk by countering attack vectors and/or eliminating corresponding vulnerabilities.

Unlike traditional approaches, the approach of process 400 enables modeling of cyber-attacks that is objective, deterministic, quantitative, and repeatable across different computer systems and that may be applied to a computer system such as computer system 101 to improve cyber-robustness.

FIG. 5 shows illustrative computer configuration 500 that utilizes the flowchart shown in FIG. 4 in accordance with one or more exemplary embodiments. Assessment computer system 502 assesses and adjusts the cyber-robustness of evaluated computer system 501 based on protection data 551. Assessment computer system 502 may download and/or activate cyber-tools from tool repository 503. With some embodiments, tool repository 503 may be a separate computer server that is internal or external to evaluated computer system 501.

Figure 8:
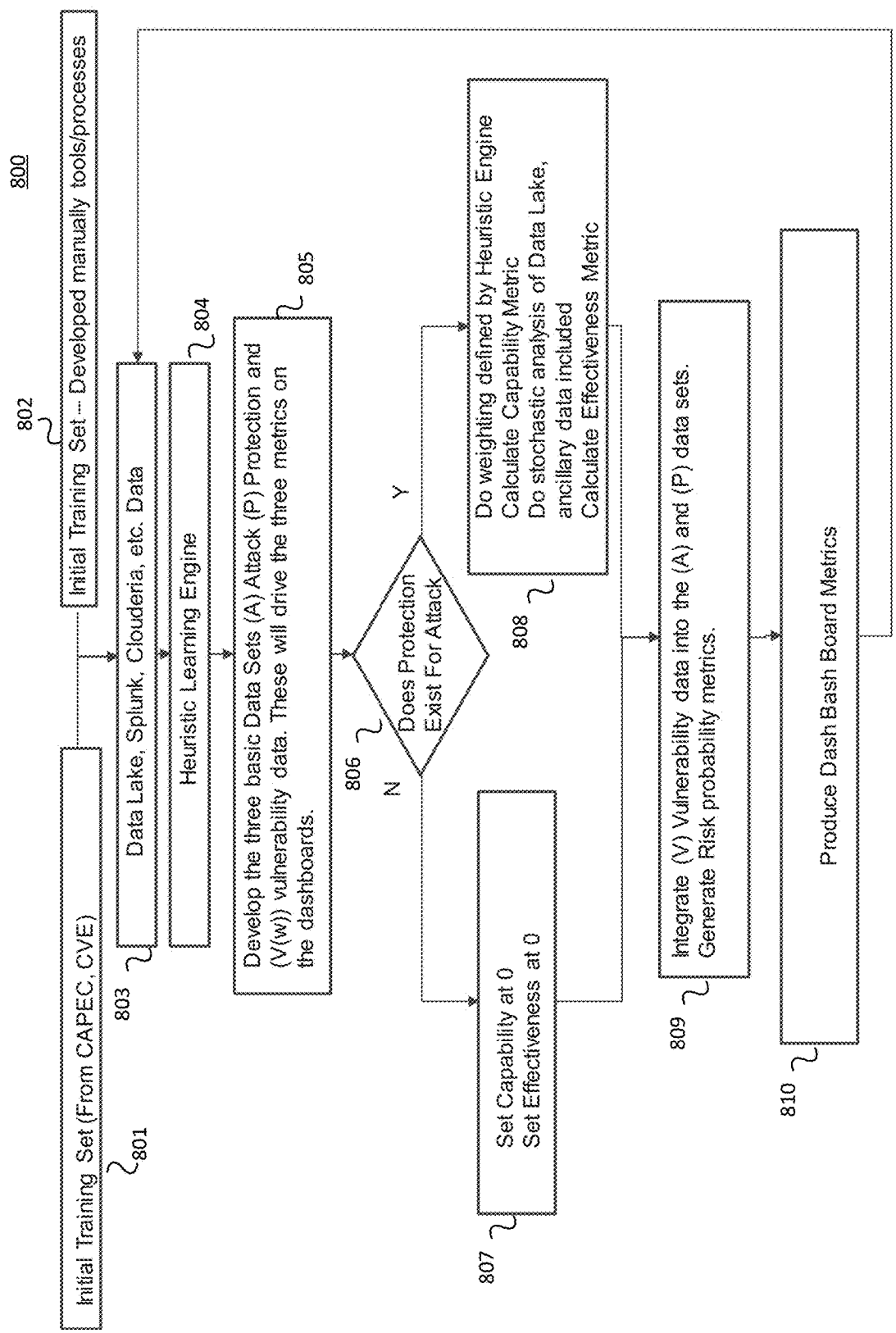
FIG. 8 shows a flowchart that may be executed by an assessment computing device for generating dashboard metrics that gauge cyber-robustness in accordance with one or more exemplary embodiments.

FIG. 8 shows flowchart 800 that may be executed by an assessment computing device 102 or 502 for generating dashboard metrics that gauge the cyber-robustness of computer system 101 or 501 in accordance with one or more exemplary embodiments.

Similar to process 400 (shown in FIG. 4), process 800 processes CVE data, CAPEC data, and cyber-tool data and processes protection data by a heuristic engine at blocks 801-804. Process 800 generates three dashboard metrics C, E(t), and R(p) at blocks 805-810. With some embodiments, process 800 generates dashboard metrics in accordance with EQs. 1-3. E(t) is indicative of the robustness associated with cyber-tool t and R(p) is indicative of the risk associated with a given vulnerability and protection method.

$$C = \frac{A \cap P(t)}{|A|} \quad \text{(EQ. 1)}$$

$$E(t) = C(t) \cap H \quad \text{(EQ. 2)}$$

$$R(p) = V(w) * (1/E(t)) \quad \text{(EQ. 3)}$$

where A is a set of an attack vector, P is a set of protection methods, p is a member of P, H is an heuristic engine output, T is a set of cyber-tools, process, or personnel, t is a member of T, and w is the weight of a vulnerability V.

Metric C may be used for gap analysis, showing what protection capability is missing or needed and the percentage of coverage.

Metric E(t) may be used for mitigation analysis about the mitigation effect of the protection capability. E(t) may also be referred as the mitigation metric since it measures the mitigation effect of the protection capability.

Metric R(p) is directed to the probability of risk in the basic risk equation: Risk=Probability×Impact.

As an example, metrics may be determined for an attack pattern in which an adversary leverages remote services such as RDP, telnet, SSH, and VNC to log into a system with stolen credentials (CAPEC attack pattern ID 555). With a hypothetical computer system, the protection tools associated with the corresponding attack vectors are:

| Tool | Attack Vector | Protection Method | Data Source | Effectiveness Indicators | Applies | Capability |
|------|--------------|-------------------|-------------|--------------------------|---------|------------|
| Host System | Host-Server software must rely on weak session IDs proof and/or verification | Identity Access Verification | syslog | "login" "user" | YES | 1 |
| Firewall System | Firewall Attacker must be able to access the target system | Blocking IP | firewall log | "dest_port" "Deny" | YES | 1 |
| NA | Network sniffing. Using a network sniffer such as wireshark, the attacker observes communications into and out of the target system | Use fuzz testing during the software QA process to uncover any surprises, uncover any assumptions or unexpected behavior | NA | NA | NO | 0 |

With this example, for the three CAPEC protection methods, we do not have a tool/process for fuzz testing during QA. While this is not a capability issue for this vulnerability, if this were an enterprise gap analysis on this set of CAPEC attack vectors, the enterprise capability metric C would be 66.67%.

Continuing the above example, we may determine the effectiveness from the following hypothetical log information:

Host Log:

1) telnetd[25015]: Login succeeded user=grasielle auth=grasielle host=my.lab.ossec.net [2.2.3.4]
2) telnetd[25015]: Login failed user=jackson auth=grasielle host=imapd.lab.ossec.net [1.2.3.4]

Firewall Log:

3) Jun 2 14:55:46 fire00 fire00: NetScreen device_id=fire00 [Root]system-notification-00257(traffic): start_time="2006-06-02 14:55:45" duration=0 policy_id=119 service=tcp/port:23 proto=17 src zone=Trust dst zone=Untrust action=Deny sent=0 rcvd=0 src=192.168.2.1 dst=1.2.3.4 src_port=3036 dst_port=23
4) Jun 2 14:53:31 fire00 aka1: NetScreen device_id=aka1 [Root]system-notification-00257(traffic): start_time="2006-06-02 14:53:30" duration=0 policy_id=120 service=tcp/port:23 proto=17 src zone=Trust dst zone=DMZ action=Deny sent=0 rcvd=0 src=192.168.2.2 dst=1.2.3.4 src_port=3604 dst_port=23

Based on the above log information, we can determine the effectiveness from the following:

| Effectiveness | Positive Outcome | Pattern Found |
|---------------|------------------|---------------|
| Host | 1.00 | 2.00 |
| Firewall | 2.00 | 2.00 |
| Total | 3.00 | 4.00 |

From the above, the effectiveness metric E would be ¾ or 75%.

Continuing the above example, one can determine an inherent vulnerability score for the hypothetical assessed computer system. In this example, the determined average inherent vulnerability score (probability of loss) is 46%. The average risk probability would be 12% (inherent vulnerability score*probability of being unmitigated=46%*(1−0.75))= 46%*0.25).

Metric R(p) is directed to the probability of risk in the basic risk equation: Risk=Probability×Impact. Continuing the above example, if the impact were $500,000, R(p)= 12%*$500,000=$60,000.

With some embodiments, the above metrics may be aggregated over a domain spanning a set of cyber-tools and/or attack vectors.

FIG. 9 shows example 900 of grouping protection data based on cluster analysis by a machine (heuristic) learning engine in accordance with one or more exemplary embodiments. Cluster analysis may consider many variables (perhaps hundreds or thousands) and isolate those that cause grouping.

As an example, protection data may comprise exemplary data from a web log:

2018-01-17 02:21:41 10.153.15.69 GET /var/styles/vendor.e6d4f8c3. css-443-69.37.83.145 Mozilla/5.0+(Windows+NT+10.0;+Win64; +x64)+AppleWebKit/537.36+(KHTML,+like+Gecko)+Chrome/ 63.0.3239.132+Safari/537.36 https://qa.medisspm.com/web/ 200 0 0 296
2018-01-17 16:21:41 10.153.15.69 GET /var/styles/styles.81006745. css-443-69.37.83.145 Mozilla/5.0+(Windows+NT+7.0;+Win64;

-continued

+x64)+AppleWebKit/537.36+(KHTML,+like+Gecko) +Chrome/63.0.3239.132+Safari/537.36 https://qa.medisspm1.com/web/ 400 0 0 203

In example 900, data is grouped into groups 901 and 902 when considering variable time (on the horizontal axis) and the number of occurrences of status 400 (on the vertical axis).

Figure 10:
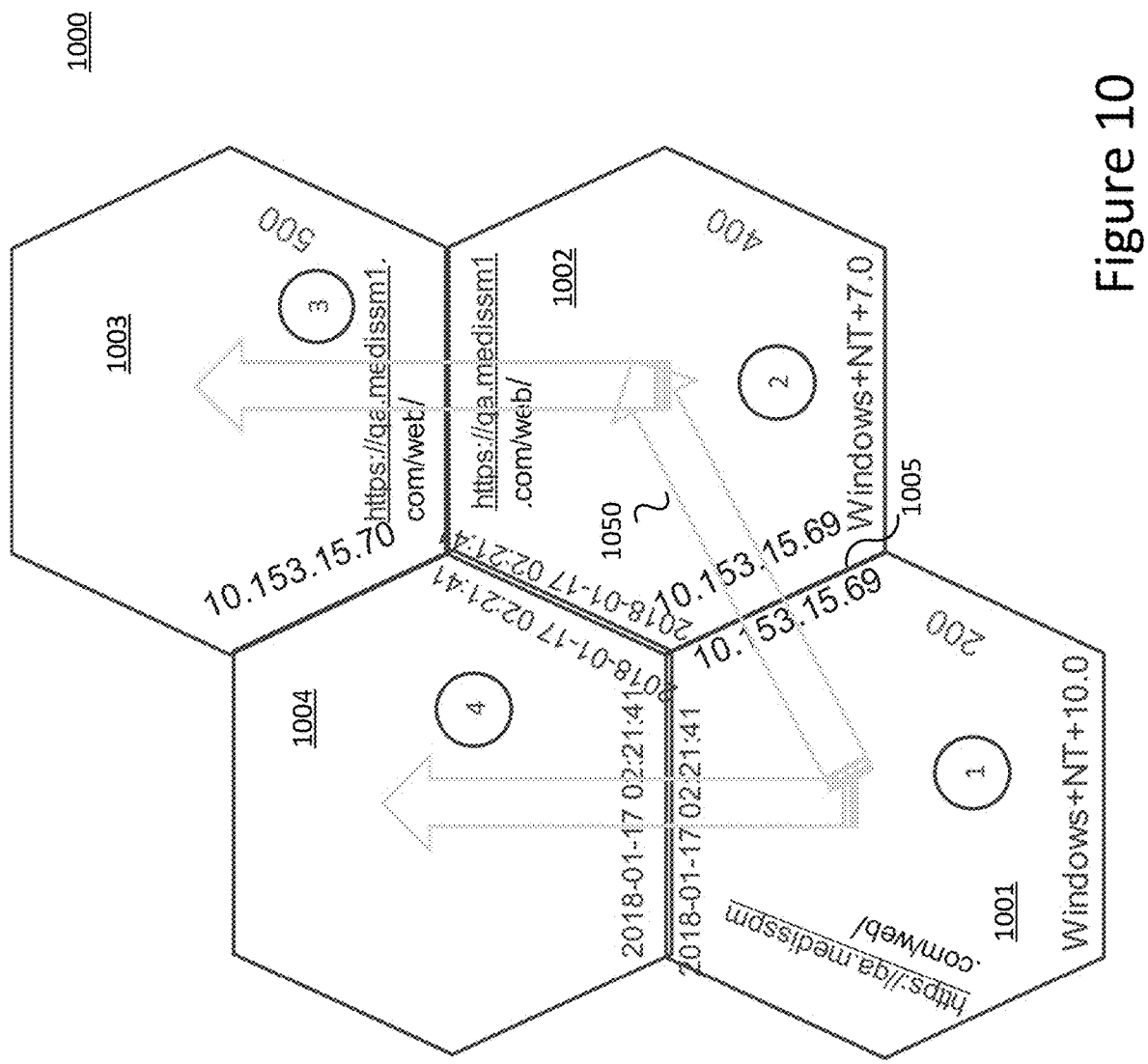
FIG. 10 shows an example of edge analysis executed by a machine learning engine in accordance with one or more exemplary embodiments.

With some embodiments, protection data is processed by the following steps:
1. Extract Items Of Interest from a Web Log
   Time, OS, Return Status (200 ok, 400 bad request)
   Bad requests add to risk
2. Do cluster analysis. Dots in group 901 correspond to Win 10.0, earlier in the day. Dots in group 902 correspond to windows 7.0 later in the day
3. Windows 7, later in the day add risk FIG. 10 shows example 1000 of edge analysis executed by a machine learning engine in accordance with one or more exemplary embodiments. Meta structures (nodes) 1001-1004 (nodes in the shape of hexagons, where each edge is assigned one of six variables or parameters) and is built from protection data based on the identified variables (for example, time and status values) as well as other variables of interest. For example, nodes 1001 and 1002 may correspond to data records associated with servers 110 and 111, respectively, as shown in FIG. 1. However, embodiments may identify a different number of variables utilizing different geometric shapes such triangles, squares, octagons, pentadecagons, and the like.

The same IP address 10.153.15.69 is assigned on node 1001 and 1002 on common edge 1005. However, nodes 1001 and 1002 have different operating systems (Windows NT 10.0 and Windows NT 7.0, respectively). The statistical probability of the same IP for two OS's is improbable, and thus is a risk factor. This observation suggests further investigation (for example, a depth and breadth search) into the specifics from the protection data as indicated by connection 1050. Connection material may be used to learn what patterns are probabilistic in determining risk. For example, further studies may determine whether an appropriate cyber-tool is detecting and acting on occurrences when a request includes an incorrect address. With this example, edged node data structures are often used in a Hadoop big data engine that processes linkages for data mapping and may leverage metadata.

Figure 11:
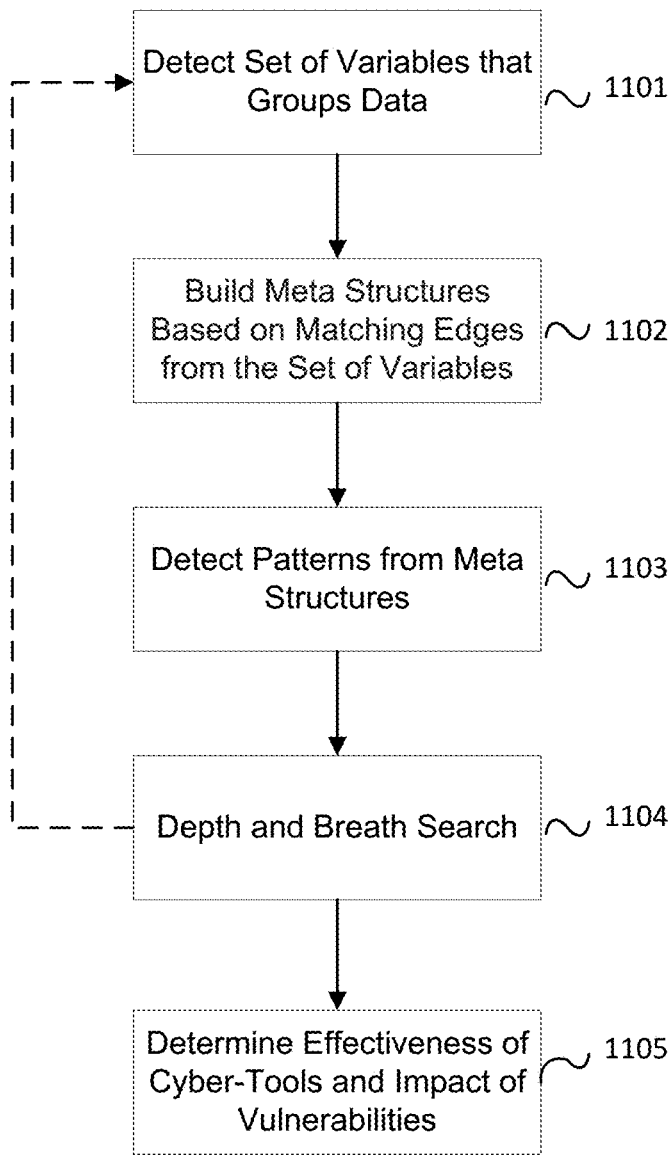
FIG. 11 shows a flowchart that may be executed by a machine learning engine in accordance with one or more exemplary embodiments.

FIG. 11 shows flowchart 1100 that may be executed by a machine learning engine in accordance with one or more exemplary embodiments. At block 1101, the machine learning engine determines a set of variables causing the grouping of the protection data as shown in FIG. 9. The set of variables provides a basis of forming meta structures at block 1102.

At block 1103 the machine learning engine detects patterns (for example, the same IP address being used by different operating systems). Consequently, a further depth/breadth search may be performed at block to investigate the detect patterns.

The learning engine may repeat blocks 1101-1104 to refine the analysis as part of the learning process.

Based on the discoveries obtained at blocks 1101-1104, the learning engine can then determine the effectiveness of one or more of the activated cyber-tools and the impact of the vulnerabilities at block 1105.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A cyber-assessment computing device, comprising:
at least one processor;
a first data interface coupled to the at least one processor;
a second data interface coupled to the at least one processor;
a tool configuration interface coupled to the at least one processor; and
at least one memory device storing computer-readable instructions that, when executed by the at least one processor, cause the cyber-assessment computing device to perform:
obtaining, though the first data interface, universal cyber-data relating attack patterns and protection methods for a set of cyber-tools;
mapping the attack patterns to the protection methods;
generating a capability model for the protection methods directed to a cyber-attack, wherein the capability model models a proper subset of known attack vectors;
activating a subset of cyber-tools based on the capability model for an assessed computer system;
obtaining, through the second data interface from an assessed computer system, protection data, wherein the protection data are generated while the assessed computer system is executing when the subset of activated cyber-tools is activated;
detecting, by a heuristic engine, at least one pattern from the protection data, wherein the at least one pattern supports a method of protection by at least one activated cyber-tool;
determining a cyber-robustness metric for the at least one activated cyber-tool from the detected at least one pattern, wherein the cyber-robustness metric quantitatively gauges a cyber-attack robustness of the capability model for the assessed computer system to the cyber-attack;
when the cyber-robustness metric is less than a targeted predetermined threshold, adjusting a cyber-robustness model for the assessed computer system to increase the cyber-robustness metric, wherein the cyber-robustness model includes a reconfiguration of the subset of cyber-tools; and
when the cyber-robustness model meets at least one criterion, applying, through the tool configuration interface, the adjusted cyber-robustness model to the assessed computer system.

2. The cyber-assessment computing device of claim 1, wherein the cyber-robustness metric characterizes an effectiveness of a cyber-tool in the set of cyber-tools.

3. The cyber-assessment computing device of claim 1, wherein the reconfiguring includes:
changing a configuration parameter for one of the activated cyber-tools to increase an efficiency metric of said one cyber-tool.

4. The cyber-assessment computing device of claim 1, wherein the reconfiguring includes:
adding a cyber-tool to the subset from the set of cyber-tools.

5. The cyber-assessment computing device of claim 1, wherein the at least one memory device stores additional computer-readable instructions that, when executed by the at least one processor, cause the cyber-assessment computing device to perform:
obtaining vulnerability data for the assessed computer system; and
determining a cyber-risk metric for a protection method from the first cyber-robustness metric and the vulnerability data.

6. The cyber-assessment computing device of claim 5, wherein the at least one memory device stores additional computer-readable instructions that, when executed by the at least one processor, cause the cyber-assessment computing device to perform:
adjusting a cyber-risk model for the assessed computer system to decrease the cyber-risk metric, wherein the cyber-robustness model includes a reconfiguration of the subset of cyber-tools; and
when the cyber-risk model meets at least one criterion, applying the adjusted risk model to the assessed computer system.

7. The cyber-assessment computing device of claim 6, wherein the at least one memory device stores additional computer-readable instructions that, when executed by the at least one processor, cause the cyber-assessment computing device to perform:
reconfiguring the subset of cyber-tools to reduce the cyber-risk metric.

8. The cyber-assessment computing device of claim 6, wherein the at least one memory device stores additional computer-readable instructions that, when executed by the at least one processor, cause the cyber-assessment computing device to perform:
prioritizing a set of vulnerabilities identified in the vulnerability data; and
eliminating one of the prioritized set of vulnerabilities.

9. The cyber-assessment computing device of claim 8, wherein the at least one memory device stores additional computer-readable instructions that, when executed by the at least one processor, cause the cyber-assessment computing device to perform:
weighting the set of vulnerabilities by at least one internal factor of the assessed computer system.

10. The cyber-assessment computing device of claim 1, wherein the detecting by the heuristic engine comprises:
identifying a set of variables resulting in a grouping of the protection data; and
forming a meta structure based on matching edges for the set of variables.

11. The cyber-assessment computing device of claim 1, wherein the protection data comprises log data generated by an activated cyber-tools.

12. The cyber-assessment computing device of claim 1, wherein the at least one memory device stores additional computer-readable instructions that, when executed by the at least one processor, cause the cyber-assessment computing device to perform:
repeating the detecting, the determining, the adjusting, and the applying over a subsequent time interval when the assessed computer system is executing.

13. A method for measuring and adjusting an cyber-attack robustness of a computer system, the method comprising:
obtaining universal cyber-data relating attack patterns and protection methods for a set of cyber-tools;
mapping the attack patterns to the protection methods;
generating a capability model for the protection methods directed to a cyber-attack, wherein the capability model models a proper subset of known attack vectors;

activating a subset of cyber-tools based on from the capability model for an assessed computer system;

obtaining protection data, wherein the protection data are generated while the assessed computer system is executing when the subset of activated cyber-tools is activated;

detecting at least one pattern from the protection data, wherein the at least one pattern supports a method of protection by at least one activated cyber-tool;

determining a cyber-robustness metric for the at least one activated cyber-tool from the detected at least one pattern, wherein the cyber-robustness metric quantitatively gauges a cyber-attack robustness of the capability model for the assessed computer system to the cyber-attack;

when the cyber-robustness metric is less than a targeted predetermined threshold, adjusting a cyber-robustness model for the assessed computer system to increase the cyber-robustness metric, wherein the cyber-robustness model includes a reconfiguration of the subset of cyber-tools; and when the cyber-robustness model meets at least one criterion, applying the adjusted robustness model to the assessed computer system.

14. The method of claim 13 further comprising:

obtaining universal cyber-data relating attack patterns and protection methods for a set of cyber-tools;

mapping the attack patterns to the protection methods;

generating a capability model for the protection methods directed to a cyber-attack; and activating a subset of cyber-tools from the capability model for the assessed computer system.

15. The method of claim 14 further comprising:

obtaining vulnerability data for the assessed computer system;

determining a cyber-risk metric for a protection method from the cyber-robustness metric and the vulnerability data;

adjusting a cyber-risk model for the assessed computer system to decrease the cyber-risk metric, wherein the cyber-robustness model includes the reconfiguration of the subset of cyber-tools; and when the cyber-risk model meets at least one criterion, applying the adjusted risk model to the assessed computer system.

16. The method of claim 15 further comprising:

prioritizing a set of vulnerabilities identified in the vulnerability data; and eliminating one of the prioritized set of vulnerabilities.

17. The method of claim 13, wherein the adjusting includes:

changing a configuration parameter for the at least one activated cyber-tool to increase an efficiency metric of the at least one activated cyber-tool.

18. The method of claim 13, wherein the adjusting includes:

adding a second cyber-tool to the at least one activated cyber-tool.

19. The method of claim 13 further comprising:

identifying a set of variables resulting in a grouping of the protection data;

forming a meta structure based on matching edges for the set of variables; and detecting an effectiveness of the at least one activated cyber-tool from the meta structure.

20. One or more non-transitory computer-readable media storing instructions that, when executed by a computing platform comprising at least one processor, memory, and a communication interface, cause the computing platform to:

obtaining universal cyber-data relating attack patterns and protection methods for a set of cyber-tools;

mapping the attack patterns to the protection methods;

generating a capability model for the protection methods directed to a cyber-attack, wherein the capability model models a proper subset of known attack vectors;

activating a subset of cyber-tools based on the capability model for a computer system;

obtaining protection data, wherein the protection data are generated while the computer system is executing when the subset of activated cyber-tools is activated;

detecting at least one pattern from the protection data, wherein the at least one pattern supports a method of protection by at least one activated cyber-tool;

determining a cyber-robustness metric for the at least one activated cyber-tool from the detected at least one pattern, wherein the cyber-robustness metric quantitatively gauges a cyber-attack robustness of the capability model for the computer system to the cyber-attack;

when the cyber-robustness metric is less than a targeted predetermined threshold, adjusting a cyber-robustness model for the computer system to increase the cyber-robustness metric, wherein the cyber-robustness model includes a reconfiguration of the subset of cyber-tools;

when the robustness model meets at least one criterion, applying the adjusted robustness model to the computer system;

obtaining vulnerability data for the computer system;

determining a cyber-risk metric for a protection method from the cyber-robustness metric and the vulnerability data; and reconfiguring the subset of cyber-tools to reduce the cyber-risk metric.

* * * * *

UNITED STATES PATENT AND TRADEMARK OFFICE
CERTIFICATE OF CORRECTION

PATENT NO. : 10,749,888 B2  
APPLICATION NO. : 15/915826  
DATED : August 18, 2020  
INVENTOR(S) : Carmichael Page 1 of 1

It is certified that error appears in the above-identified patent and that said Letters Patent is hereby corrected as shown below:

In the Claims

Column 16, Line 7:
In Claim 5, after "from the", delete "first"

Column 17, Line 1:
In Claim 13, after "on", delete "from"

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*